Nov. 13, 1962 M. MOUL 3,063,289
METHOD AND DEVICE OF DETECTING CONTAMINATION IN FUELS
Filed May 23, 1960
Fig 3
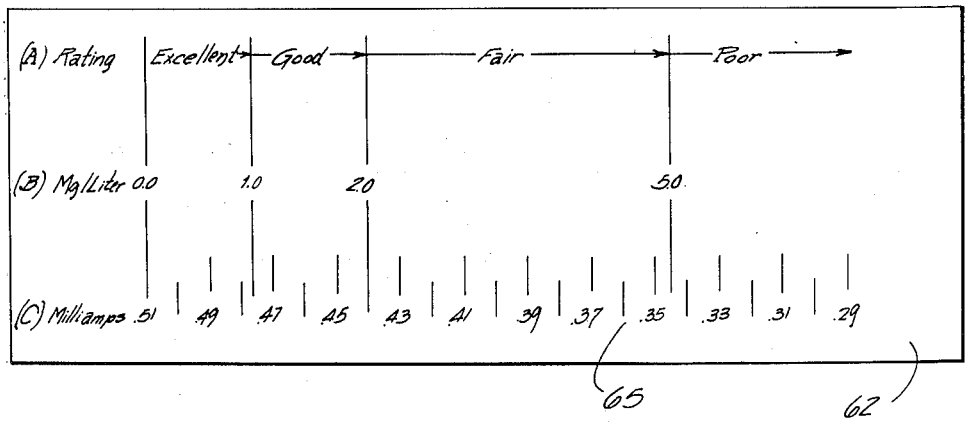
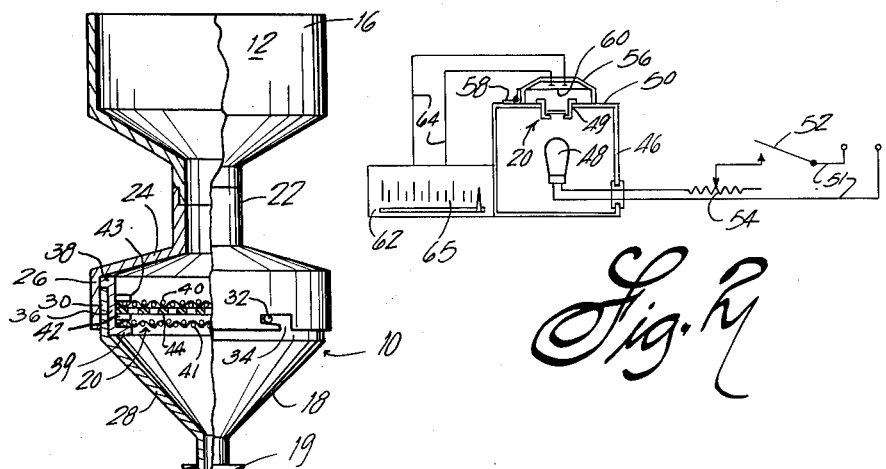
Fig. 2
Fig 1
INVENTOR.
MORTON MOUL
BY
Arthur L. Collins
Attorney 3,063,289
METHOD AND DEVICE OF DETECTING
CONTAMINATION IN FUELS
Morton Moul, 2101 Walnut St., Philadelphia, Pa.
Filed May 23, 1960, Ser. No. 31,244
3 Claims. (Cl. 73—61)
(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for determining the amount of solid impurities in liquids, particularly aircraft fuels.

The solid impurities found in aircraft fuels, especially those that have been stored for a period of time, are calcium, silicon, iron, copper and similar materials. In a typical sample the particle size will range 88 percent above 5 microns, 4 percent below 5 and above 1.2 microns, and 8 percent under 1.2 and above 0.45 microns. The amount of impurities per liter of fuel varies, but relatively speaking, it is low and most aircraft fuels are classed as low turbidity liquids. A fuel too poor for use in aircraft has been established as one containing solid impurities in excess of 5 mg. per liter of fuel; an excellent fuel has less than one mg. per liter. The determination of the amount of impurities in fuels containing more than 5 mg. per liter is unnecessary since the fuel is not usable, and below 5 mg. it is desirable to know the exact amount, since it can be used in aircraft less demanding in fuel purity requirements.

The degree of contamination in aircraft fuels is determined at present by noting the gain in weight of a filter through which a given quantity of fuel has percolated. Although accurate, the process requires the use of an oven, a sensitive weighing balance and trained personnel. Since these are not ordinarily available in the field, testing is performed at laboratories. This entails problems in shipping samples, but the biggest objection is the delay in obtaining results. To offset these objections, use in the field has been made of fuel turbidimeters in which light scattered by the suspended particles of impurities in the fuel is measured with a photocell. The reliability of these devices, however, is unsatisfactory. Measurement variations occur because of settling of the impurities, scattering of light by drops of water in the fuel and the corroding effect of fuel on the surfaces of the device which it contacts.

The present invention, therefore, contemplates providing a means for determining the amount of impurities in low turbidity fuel which is adaptable for field use by untrained personnel and which is sufficiently sensitive and responsive to provide results approaching the accuracy of laboratory techniques. More specifically, it provides a technique and device for evaluating the amount of contaminant removed from a fuel sample by a filter.

In accordance with this invention, the reliability of a filter to trap contaminants from a fuel is utilized as done heretofore, but instead of resorting to weighing techniques, the amount of contaminant is determined by measuring the current generated by a photoelectric cell in response to light that could be transmitted through the filter before and after filtration.

The invention will be better understood from the following description when read in conjunction with the drawing wherein:

FIG. 1 is an elevational view with parts broken away showing the filtering apparatus of the invention;

FIG. 2 is a longitudinal sectional view through a contaminant detecting unit or photometer constructed in accordance with the invention and a schematic wiring diagram of a circuit to which the unit is connected;

FIG. 3 is a view of the face of the indicator used in connection with the unit shown in FIG. 2 illustrating the relationship between current and amount of contaminant on a filter.

Referring to the drawing, and particularly to FIG. 1, the filtering apparatus, generally designated by the reference numeral 10, is shown to have a funnel 12, of sectional construction, arranged to be seated in a filtrate receptacle 13 to which a vacuum may be applied through a conduit 14 from a source not shown.

The funnel 12 has an upper or bowl portion 16 for holding the fuel sample and a lower or stem portion 18 through which the filtrate drains. Both portions are capable of being joined together and are designed to hold a filter assembly 20 between them. The bowl portion 16 is an open-top vessel having a neck 22 projecting from its underside. The neck's lower end is enlarged by the provision of an outwardly directed flange 24 with an axial extension 26. The upper end of stem portion 18 also is enlarged to mate with neck 22 and thus has an outward flange 28 and an axial extension 30; the latter extension, however, is of a diameter that permits its introduction into the upper bowl extension 26 as is usual in male-female couplings. A bayonet type lock in the form of a lug 32 on extension 30 and a slot 34 in extension 26 is utilized to lock the funnel portions 16 and 18 together. The lower end of the stem portion 18 carries a frusto conical rubber stopper 19 which inserts into the mouth of receptacle 14 to secure the complete funnel to it.

The filter assembly 20 has a cylindrical sleeve 36 that fits into extension 30 of stem 18 and is supported on the stem's upper end by an outward flange 38. One or more filters are carried in sleeve 36 by an inward flange 39 on its lower end. Two filters, 40 and 41, are shown in FIG. 1 separated by a spacing ring 42 and locked in place by a plastic ring 43. The upper filter, 40, has the function of collecting the solid impurities and is carried on a reinforcing screen 44 to prevent its sagging and collecting particles at only one spot. The second or lower filter, 41, is necessary only for dyed fuels which will color the filter and to some extent thereby reduce its ability to pass light. For all practical purposes, both filters tiered as shown will absorb dye from fuel to the same degree. The lower filter may thus be used to establish the tare for dye in the upper filter.

Filters 40 and 41 are alike and made of transparent material. For fuel, as represented by the sample given heretofore, it is preferred to use a membraneous material filter composed of cellulose esters. A Millipore filter, manufactured by the Millipore Filter Corporation, which is 47 millimeters in diameter with a 0.45 micron pore size is suitable. This diameter filter is sufficient to hold the particles from a four hundred cc. sample of most aircraft fuels in one layer. The filters are used as screens over a photoelectric cell, consequently it is preferred that their entire surface is not covered with the sediment and some light will pass through the filter after use in filtering.

The amount of sediment deposited on the filter 40 is determined with use of the device shown in FIG. 2, which may be termed a photometer. It comprises an enclosed, light proof box 46 of any suitable shape, preferably rectangular. It has an electric light bulb 48 mounted within it at a suitable location and an aperture 49 in its top 50. Power is supplied to the bulb 48 by lines 51 from a 110 v. A.C. source not shown through a switch 52. The light intensity of bulb 48 is maintained at a desired level by some conventional means, as by a voltage regulator shown at 54.

Aperture 49 is of suitable shape and size for mounting filter assembly 20 by resting the sleeve flange 38 on the top 50, in the same manner as when mounted in filter stem 18. A cap 56 is secured to top 50 by a hinge 58 in a location which permits it to function as a movable closure over aperture 49. A conventional photoelectric cell 60, for instance a G.E. model 8 PV, is mounted on the underside of cap 56 and connected to a milliammeter 62 by a pair of leads 64. The dial 65 of milliammeter 62 is graduated as shown in FIG. 3 to permit direct reading of milliamps, milligrams of sediment per liter of fuel and the relative purity of the fuel for aircraft use.

In the practice of the invention, the filtering apparatus is assembled as shown in FIG. 1 with or without the lower filter 41 depending on whether a dyed fuel is being tested as explained heretofore. A four hundred cc. fuel sample is then introduced into the bowl 16 and a vacuum applied to receptacle 13 through the conduit 14.

After all the fuel has drained through, the sides of the bowl 16 are washed with clean fuel. The funnel 12 is then separated into its parts and the filter assembly 20 removed and placed into aperture 49 of the photometer containing only one filter, if more than one was used. The cap 56 is placed over the aperture 49, light bulb 43 illuminated and a reading taken on the B scale of milliammeter 62.

If two filters had been used, a second reading on B scale is taken with only the second filter mounted in the photometer. The amount of impurities per liter of fuel is shown by the difference in the readings. If only one filter was used, as in the case of undyed fuels, two readings are nevertheless made and their difference indicates the fuel condition. The first reading is made on the filter before the fuel sample has been passed through it, and the second, after filtration.

The filters should be wetted with fuel or some other suitable lubricant before taking any readings to make them more transparent. In actual tests it has been found that more consistent results were obtained with a fuel wetted filter than with a dry filter.

The filter method of the invention has been found to have a considerable advantage in accuracy of results over a centrifuge or turbidimeter. Furthermore, the time required to run a test is less than one tenth than that required for the centrifuge and less than half than that of a filter-weighing process.

Obviously many modifications and variations of the present invention are possible in the light of the above teachings. It is therefore to be understood that within the scope of the appended claims the invention may be practiced otherwise than as specifically described.

What is claimed is:

1. The method of determining the amount of solid particles in an aircraft fuel in the liquid state, comprising causing a current to flow by subjecting a photoelectric cell to a light of predetermined intensity, wetting a filter of membraneous ester material with said fuel, screening said cell from said light with said wetter filter to cause a first change in current flow, collecting said particles on said filter by passing a definite quantity of said liquid therethrough, screening said photoelectric cell from said filter containing said particles to produce a second change in current flow different than said first change, the difference between said changes being the result of and proportional to the amount of particles on said filter.

2. The method determining the amount of solid particles in a dyed aircraft liquid fuel, comprising causing a current to flow by subjecting a photoelectric cell to a light of predetermined intensity, wetting a pair of equal size membraneous ester filters wtih said fuel, filtering a definite quantity of said fuel through said filters whereby said particles in said definite quantity collect on one of said filters and both of said filters are dyed, sequentially screening said photoelectric cell with each of said filters thereby causing changes in current flow and whereby the difference between said change is the result of and proportional to the amount of particles on said one filter.

3. A device for determining the amount of residue deposited in one layer on a filter comprising a light proof container having an aperture in a wall thereof, a sleeve having an inner flange at one end and an outer flange at the other end adapted to be removably supported in said aperture on said outer flange, a membraneous ester filter supported in said sleeve supported by said inner flange, a light of predetermined intensity mounted in said container, a photoelectric cell for generating electric current in proportion to the intensity of light falling on it movably mounted over said aperture adapted to seal said aperture and to be screened by said filter from said light, and a meter electrically connected to said cell for indicating the current generated.

References Cited in the file of this patent

UNITED STATES PATENTS

| | | |
|---|---|---|
| 2,068,476 | Thomas | Jan. 19, 1937 |
| 2,225,984 | Erekson | Dec. 24, 1940 |
| 2,756,626 | Lansing et al. | July 31, 1956 |
| 2,819,608 | McLaren et al. | Jan. 14, 1958 |